United States Patent [19]

Culkin

[11] Patent Number: 5,080,770
[45] Date of Patent: Jan. 14, 1992

[54] APPARATUS AND METHOD FOR SEPARATING PARTICLES

[76] Inventor: Joseph B. Culkin, 1552 Beach St., Ste. P, Oakland, Calif. 94608

[21] Appl. No.: 405,658

[22] Filed: Sep. 11, 1989

[51] Int. Cl.$^5$ .......................................... G01N 27/26
[52] U.S. Cl. ............................. 204/182.3; 204/180.1; 204/301
[58] Field of Search ................. 204/301, 182.3, 180.1, 204/182.1

[56] References Cited

U.S. PATENT DOCUMENTS

| | | | |
|---|---|---|---|
| 3,870,617 | 3/1975 | Bourat | 204/301 |
| 3,989,613 | 11/1976 | Gritzner | 204/301 |
| 4,107,026 | 8/1978 | Freeman | 204/300 R |
| 4,204,929 | 5/1980 | Bier | 204/180 |
| 4,323,439 | 4/1982 | O'Farrell | 204/180 |
| 4,383,905 | 5/1983 | Richman | 204/182.3 |
| 4,698,142 | 10/1987 | Muroi et al. | 204/182.3 |

OTHER PUBLICATIONS

Custler, Article "Bioseparation"-pp. 260-265, 1988.

Primary Examiner—John Niebling
Assistant Examiner—Arun S. Phasge
Attorney, Agent, or Firm—Bielen, Peterson & Lampe

[57] ABSTRACT

A method and apparatus for separating particles mixed with liquid utilizing a container for holding the same. The system also employs at least one separation membrane, which is permeable to the heterogeneous particles mixed with the liquid, divides the container into first and second separation chambers. A pump biases the flow of the particle liquid mixture from one side of the membrane to the other. Simultaneously, an electric field or potential is applied to the particle liquid mixture to bias flow of the same in the other direction.

19 Claims, 5 Drawing Sheets

APPARATUS AND METHOD FOR SEPARATING PARTICLES

BACKGROUND OF THE INVENTION

The present invention relates to a novel apparatus and method for separating heterogeneous particles in liquid medium.

Particles suspended in a liquid, migrate when subjected to an electric field produced by passing a current through the suspension. Such particles may be interpreted to include ions, molecules, such as protein molecules, or colloidal particles such as kaolin. The speed of migration per unit of electric field strength inside the slurry or suspension is called the electrophoretic mobility of the particle. Particles, colloidal, molecular or ionic, are also motivated due to the mean flow or convective flow of the particle-liquid mixture. In this case, the particles tend to act as fluid material points. The imposition of an electric field on particles subject to a mean or convective flow should, ideally, result in the motion of the particles being of the linear sum of the motions, thereof due to the electric field and the mean flow. Unfortunately, application of an electric field can cause inhomogeneous heating, chemical reactions, and other effects which upset expected flow patterns. Thus, there is a complex interaction between the electric field strength and the motion of fluids subjected to imposed electric fields. In the past, attempts have been made to suppress this complex interaction (thermal convective motion) by applying an electric field inside a porous medium such as a gel. Since these gels have zero convective velocity, which particle species are separated solely by the effect of the electric field imposed i.e.: by virtue of such particles different electrophoretic mobilities and sizes.

U.S. Pat. No. 4,323,439 to O'Farrel describes a system in which a carrier fluid is forced through a chromatography matrix found in a packed column. In addition, a current is imposed on a packed column to employ electrophoretic mobility and size characteristics of the particles for the purpose of separation. A target species is then held inside the column while the other molecular species are driven out of the column by the mean flow or by the electric field.

U.S. Pat. No. 4,107,026 to Freeman describes an electrofiltration apparatus where a membrane is used in conjunction with an electric field to separate colloidal particles from small molecules in water. The membranes shown are non-retentive i.e. the colloidal particles (Kaolin) will easily pass through the pores of the membrane driven by a pressure gradient across the membrane. However, the colloidal particles would be retained by the membrane when an electric current is passed through the pores of the membrane, in opposition to the convective forces prior described. As a result, water and small ions pass through the pores of the membrane while the highly charged colloidal particles are held back, resulting in a separation of the ions from the colloidal particles.

U.S. Pat. No. 4,204,929 to Bier shows a device having a number of chambers formed by a separated parallel membranes. A different pH is imposed on each chamber. An electric field is also applied across the chambers to induce electrophoretic movement of the materials. Proteins, or other biological materials, migrate from one chamber to another until they reach a pH value which counteracts the electrophoretic mobility. At this point, the proteins stop. Thus, a "banding" of biological materials is achieved. However, the Bier system requires the establishment of a separate pH in each chamber which is very difficult and expensive to achieve.

An article by Custler in a text entitled "Bioseparation" theorizes an unstudied concept of using convective flow counter current to electrophoretic motion to obtain particle separation.

A separator for particles in a fluid, utilizing the principles of electrofiltration and electrophoresis, which is accurate, relatively inexpensive and easily controllable would be a great advance in the art of chemical separations.

SUMMARY OF THE INVENTION

In accordance with the present invention a novel and useful apparatus and method for separating particles mixed with a fluid is provided.

The separator of the present invention utilizes a container for holding the heterogeneous particles and the liquid mixed therewith. The container includes at least one separation membrane permeable to at least a portion of the heterogeneous particles mixed with the liquid. The separation membrane thus divides the container into at least first and second chambers. Where a multiplicity or plurality of such separation membranes are employed, the container is divided into a multiplicity of adjacent separation chambers. Typically five to fifteen such separation chambers may be employed, although the invention is not restricted to any number of separation chambers within the container. The separation chambers, or trays forming the separation chambers, may be stacked one on top of another within the container. Means is employed within each chamber or tray to assure blending of the particle and liquid mixture without disrupting laminar flow patterns.

Means is employed for pumping the heterogeneous particle and liquid mixture i.e. a slurry, colloidal suspension, and the like, through the container to bias flow of the particles mixed with the liquid through each separation membrane. Thus, particles would flow from one separation chamber to the adjacent separation chamber as a result of the mean flow establish by the pumping means. The separation membranes would include pores that are much larger than any of the particles requiring separation in the present system. Such pumping means may include the injection of an electrolyte buffer in an initial cross-flow direction on one side of the separation membrane in the first separation chamber and withdrawing buffer through filter means from an essentially identical separation chamber on the other side of the separation membrane. Heat exchanger means may also be employed to maintain a selective temperature range of the fluid within the container. Such cross-flow through individual separation chambers may be looped or passed back into the stack of separation chambers formed by the separation membranes i.e. a tray stack.

Filter means may also be used in conjunction with individual separation chambers to remove the electrolytic buffer and reject the particles being separated. Thus, the particles are maintained in the separation stack while the electrolytic buffer may be directed to waste.

Means is also included for applying an electric potential to the particles mixed with the liquid to bias flow of the particles through the separation membranes forming the multiplicity of separation chambers in a direction opposite to the mean flow established by the pumping means. In other words, the pumping means would urge particles through the membranes through one side thereof while the electrical potential would urge the particles through the membranes from the other side. In essence, with a multiplicity of chambers or trays, a multicomponent fraction collection apparatus is formed. Consequently highly electrophoretically mobile species will be held to one end of the container by the electric field. Slightly less electrophoretically mobile species will accumulate in the adjacent chamber. Even less electrophoretically mobile species will accumulate toward the opposite end of the container. Such fractionation is enhanced by withdrawal of the electrolytic buffer at each separation chamber or tray by the use of the filter means.

The means for applying an electrical potential to the heterogeneous particles mixed with the liquid in the container may include a pair of electrodes, one placed within the container at one end of the stack of membranes and at the other end of such stack of membranes. The electrodes would be separated from the separation chambers formed by the separation membranes by the use of a protective membrane which essentially prevents the passage of ions to the electrode. Of course, the electrodes would connect to a voltage source and pass the electric field though the protective membrane in each separation membrane within the container. The protective membrane would essentially form an electrode chamber enclosing each of the electrodes.

The separator of the present invention may also include isolation or guard membranes which are placed between the electrode chamber and the separation chambers formed by the separation membranes. The isolation membrane would essentially be impermeable to the heterogeneous particles being separated, but permeable to the carrier liquid. An electrolytic buffer may also be circulated through the isolation chamber and in the maintenance of a constant pH throughout the container. In addition, the isolation chamber would possess an mean flow intensity and an electric field strength identical to the separation chambers adjacent thereto.

Particles may be collected at each of the separation chambers after a particular time has elapsed where separation or fractionization has occurred. Where particles such as proteins are not easily separated utilizing the relatively constant pH and opposing electrophoretic and convective forces of the present invention, a fraction may be collected and further separated in an identical multi-chamber separator maintained at pH different from the pH in the first separator.

It should be noted that the number of separation membranes or trays, as well as the number of isolation chambers or trays, may be altered depending on the number of fractions and the purity of the fractions desired to be recovered.

It may be apparent that a novel and useful apparatus and method for separation of particles in a fluid has been described.

It is therefore an object of the present invention to provide a separator for heterogeneous particles in a liquid medium which is relatively simple to manufacture and operate.

It is another object of the present invention to provide a separator for heterogeneous particles in a liquid medium which is extremely accurate in fractionating particles based on their electrophoretic mobility and convective characteristics.

A further object of the present invention is to provide a separator for heterogeneous particles in an liquid medium which essentially operates at a constant pH.

A further object of the present invention is to provide a separator for heterogeneous particles in a liquid medium which may be used on an analytic or preparative scale.

Another object of the present invention is to provide a separator for heterogeneous particles in a liquid medium which compensates for temperature changes of the fluid during the separation process.

A further object of the present invention is to provide a separator for heterogeneous particles in a liquid medium which is capable of separating heterogeneous particles ranging in size from ions to colloidal particles.

The invention possess other objects and advantages especially as concerns particular characteristics and features thereof which will become apparent as the specification continues.

Another object of the present invention provides a separation for heterogeneous proteins which eliminates the need for pre-treatment or precipitation of such proteins.

Yet another object of the present invention is to provide a separator for heterogeneous particles which operates rapidly iwth low residence time.

A further object of the present invention is to provide a separator for heterogeneous particles which contains a minimum quantity of moving mechanical parts.

Figure 1:
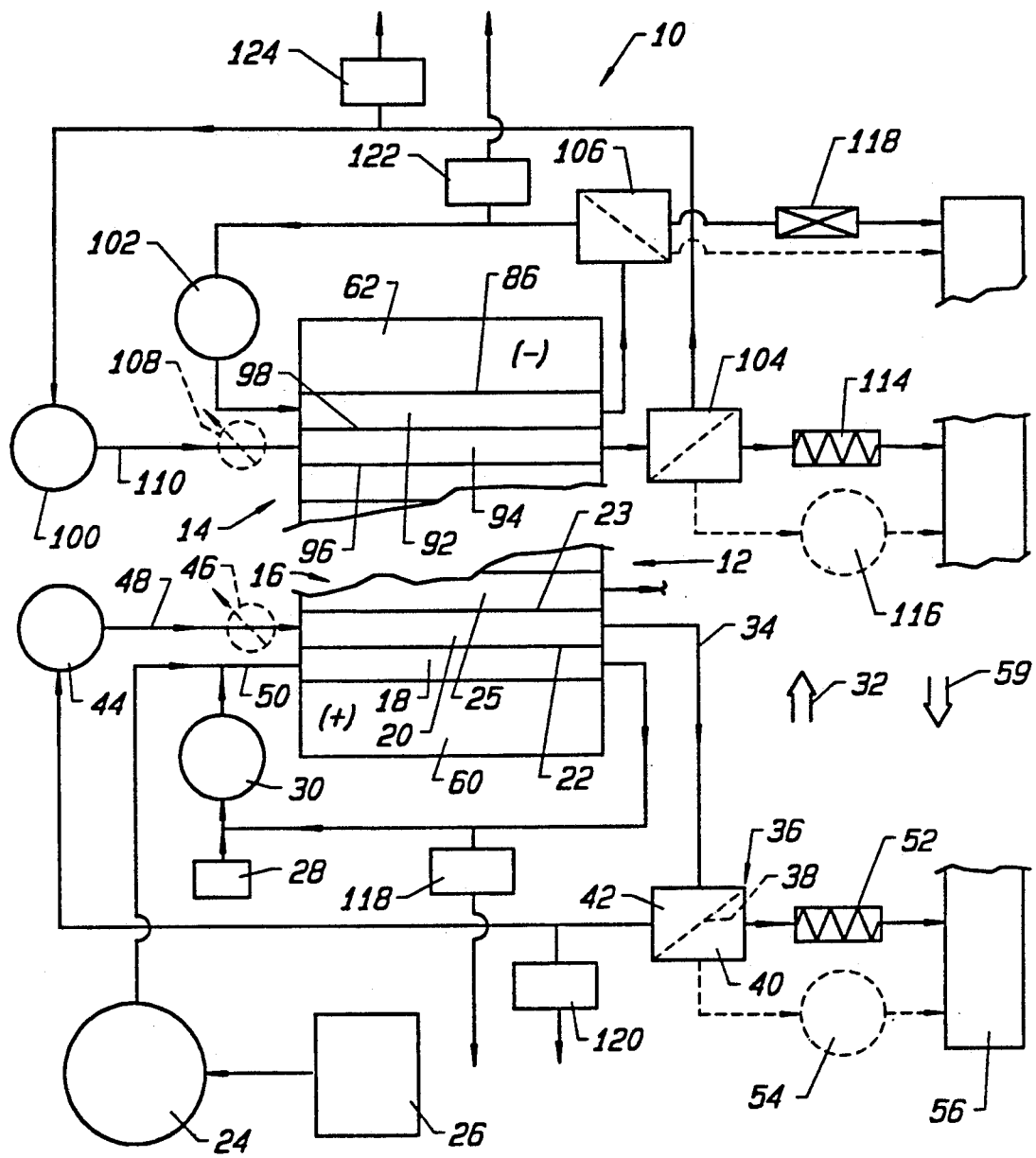
FIG. 1 is an overall schematic of the apparatus of the present invention using multiple separation membranes and separation chambers, as well as depicting alternate methods for controlling the mean convective flow through the apparatus.

For a better understanding of the invention reference is made to the following detailed description of the preferred embodiments thereof which should be referenced to the hereinabove described drawings.

DESCRIPTION OF THE PREFERRED EMBODIMENTS

Various aspects of the present invention will evolve from the following detailed description of the preferred embodiments which should be further understood in conjunction with the prior described drawings.

The invention as a whole is depicted in the drawings by reference character 10. The separator 10 may be employed to classify or fractionate colloidal and molecular species having differing electrophoretic mobilities. Thus, the word "particle" used in the present invention refers to species such as ions, molecules, colloidal particles, and the like. Heterogeneous particles may be separated by the present invention 10 from a slurry, solution or like mixture.

With reference to FIG. 1, it may be observed that a container 12 is provided for holding the particles mixed with a liquid, such as water. Container 12 is divided into a plurality of chambers 14 by a multiplicity of separation membranes 16. For example, chambers 18 and 20 are formed by separation membrane 22. Separation membrane 22 may be a polycarbonate membrane, having a thickness of between 5 and 10 microns. The pores of separation membranes 16 are chosen to be as small as practical, the limit being that pores too small to pass some of the particles to be separated will greatly hamper the operation of separator 10. If proteins are to be separated in separator 10, separation membranes 16 will possess pores about 0.1 micron in diameter. Colloidal particles such as a mixture of clay and iron ore, require pores to be as much as tens of microns. Separation membrane 22, as well as the other plurality of separation membranes 16, may be track etched membranes having pores that are well defined right circular cylinders of uniform width. For example Nuclepore Corp. manufactures such a membrane. Plurality of separation membranes 16 may be treated by surface coating the same with silane to prevent electro-osmotic pumping caused by the presence of a charge on the surface of the pores of the membrane.

Pumping means 24 is also provided to pump a buffer solution from source 26 as well as the feed injector 28 through circulation pump 30. A mean convective flow is established along directional arrow 32 by passing the effluent stream 34 from adjacent chamber 20 through a ultrafiltration module or device 36. Ultrafilter 38 divides ultrafiltration module 36 such that electrolyte passes through ultrafilter 38 into chamber 40 while the heterogeneous particles sought for separation pass through chamber 42, and are passed by circulation pump 44 into chamber 20. Ultrafiltration membrane 38 may be constructed of cellulose acetate, polysulfone or similar material and may be distributed by Amicon of Danford Mass. Heat exchanger 46 may also be employed to cool the recirculation stream 48 flowing into chamber 20 to prevent overheating problems which may destroy the characteristics of the stream 48, especially if the particles to be separated are biological entities. Cooling also ensures that the liquid stream 48 will possess a conductivity which is essentially equal to stream 50, which is important in the maintenance of a homogeneous electric field strength, which will be discussed hereinafter. The mean flow of the electrolyte from buffer source 26 is aided by the withdrawal of electrolyte from chamber 40 of ultrafilter module 36. Ultrafiltration modules, circulation pumps, and heat exchangers similar to module 36, pump 44, and heat exchanger 46, may be employed with respect to each of the plurality of separation chambers 14. Flow resistor 52 or permeate pump 54 may be employed to control the rate of electrolyte removal. In either case, the electrolyte removed from chamber 40 passes to waste tank 56. Such electrolyte may be recycled to buffer source 26 after purification, if needed.

Means 58 for applying electric field to the heterogeneous particles found in container 12 is also included in the present application. Means 58 applies an electric force in the direction of arrow 59. Means 58 may take the form of electrode assemblies 60 and 62 placed at a ends of container 12 with the plurality of separation chambers 14, formed by plurality of separation membranes 16, lying therebetween.

Figure 3:
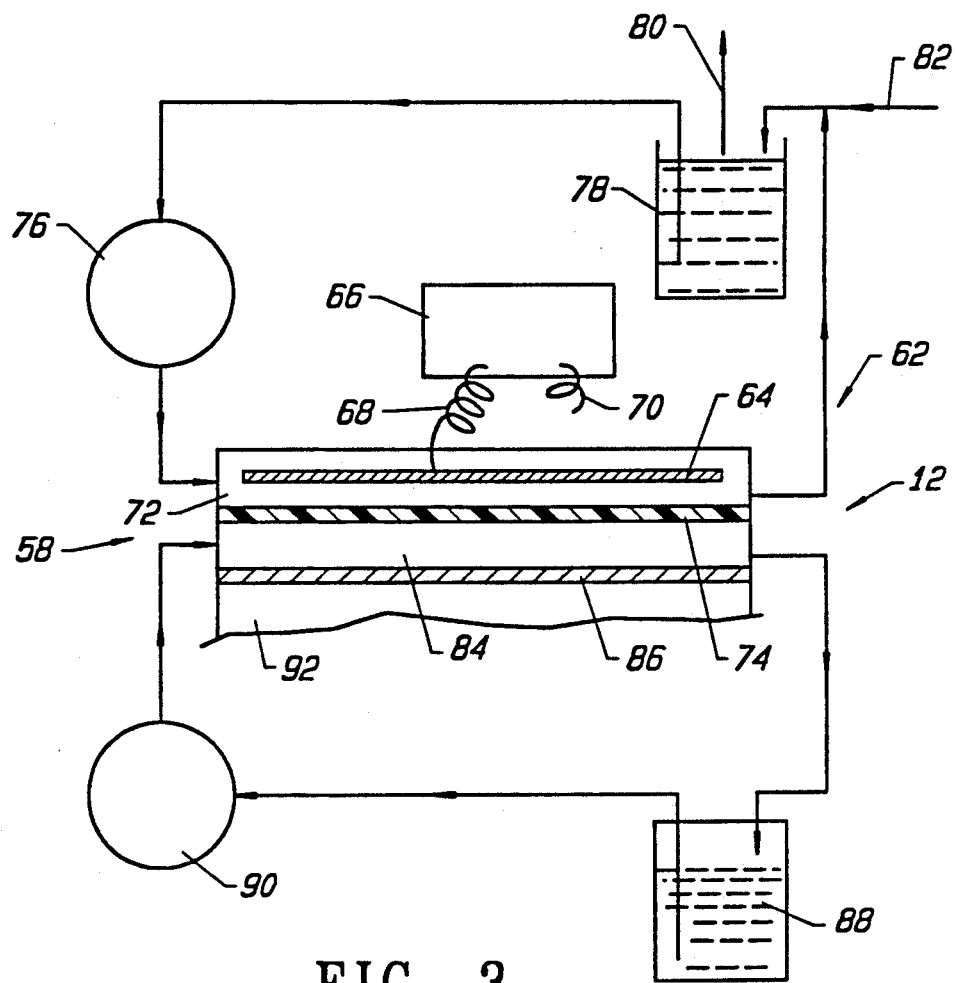
FIG. 3 is a schematic view depicting an electrode utilized in the present invention.

With reference to FIG. 3, electrode assembly 62 is illustrated in greater detail. Electrode 64 is connected to a DC power supply 66 by a wire 68 constructed of compatible material, e.g. platinum. Wire 70 leads to another electrode (not shown) in electrode assembly 60, FIG. 1. As depicted in the drawings, the electrode 64 found in electrode assembly 62 serves as a cathode, while the electrode in electrode assembly 60 serves as an anode. However, it should be obvious that the reverse electrical orientation could easily be assembled. Electrode 64 may be enclosed in an electrode chamber 72 by a dialysis or diafiltration membrane 74. Membrane 74 possesses a low hydraulic permeability and a charge transfer number of near 0.5. Thus, gaseous reaction products formed within electrode chamber 72 are prevented from passing downwardly through container 12 and into plurality of separation chambers 14. It should be understood that the electrical field produced by means 58 permeates membrane 74 to a uniform such electrical field on plurality of separation chambers 14. Electrolytic pump 76 circulates electrolyte from electrolyte tank 78 through electrode chamber 72 to maintain a constant pH and thus diminish any polarization effects therein. Gas stream 80 represents the purging of gases from electrolyte tank 78, while make-up stream 82 represents components added to electrolyte tank 78 to maintain the consistency of the electrolyte being pumped to chamber 72. It should be noted that electrolyte used in electrolyte tank 78 may be any suitable electrolyte such as a sodium phosphate solution.

Electrode assembly 62 also includes isolation chamber or "guard tray" 84 formed by ultrafilter membrane 86, similar in construction to ultrafilter membrane 38 of ultrafiltration device 36. Again, ultrafilter membrane 86 prevents passage of any of the heterogeneous particles in container 12 while permitting buffer solution to pass into isolation chamber 84. Isolation chamber 34 further ensures the shielding of polarization effects from adjacent separation chamber 92 as well as the remainder of plurality of chambers 94. Electrolyte or ballast is circulated from a large capacity ballast tank 88 by ballast pump 90. Returning to FIG. 1, it may be observed that separation chamber 92 and separation chamber 94 formed by ultrafilter membrane 86 and separation membranes 96 and 98 operate similarly to chambers 18 and 20, heretofore described. For example, circulation pumps 100 and 102 and ultrafiltraton modules 104 and 106 associate with chambers 94 and 92 respectively. In addition, heat exchanger 108 cools the effluent stream 110 from circulation pump 100 entering chamber 94. Further, with respect to chamber 94 flow resistor means 114 or pump means 116 is employed to control the mean flow of heterogeneous particles and liquid buffer from injector 28 and buffer source 26, respectively. Valve 118, essentially a variable flow resistor, meters the permeate effluent from ultrafiltration module 106 to waste tank 56. Fractionated or separated particles are harvested from the streams recirculated from separation chambers 18, 20 92, and 94 by product recovery taps 118, 120, 122, and 124 respectively.

Returning now to FIG. 2, a detail of an embodiment of container 12 is depicted having four separation chambers formed by separation trays 126, 128, 130, and 132.

Figure 2:
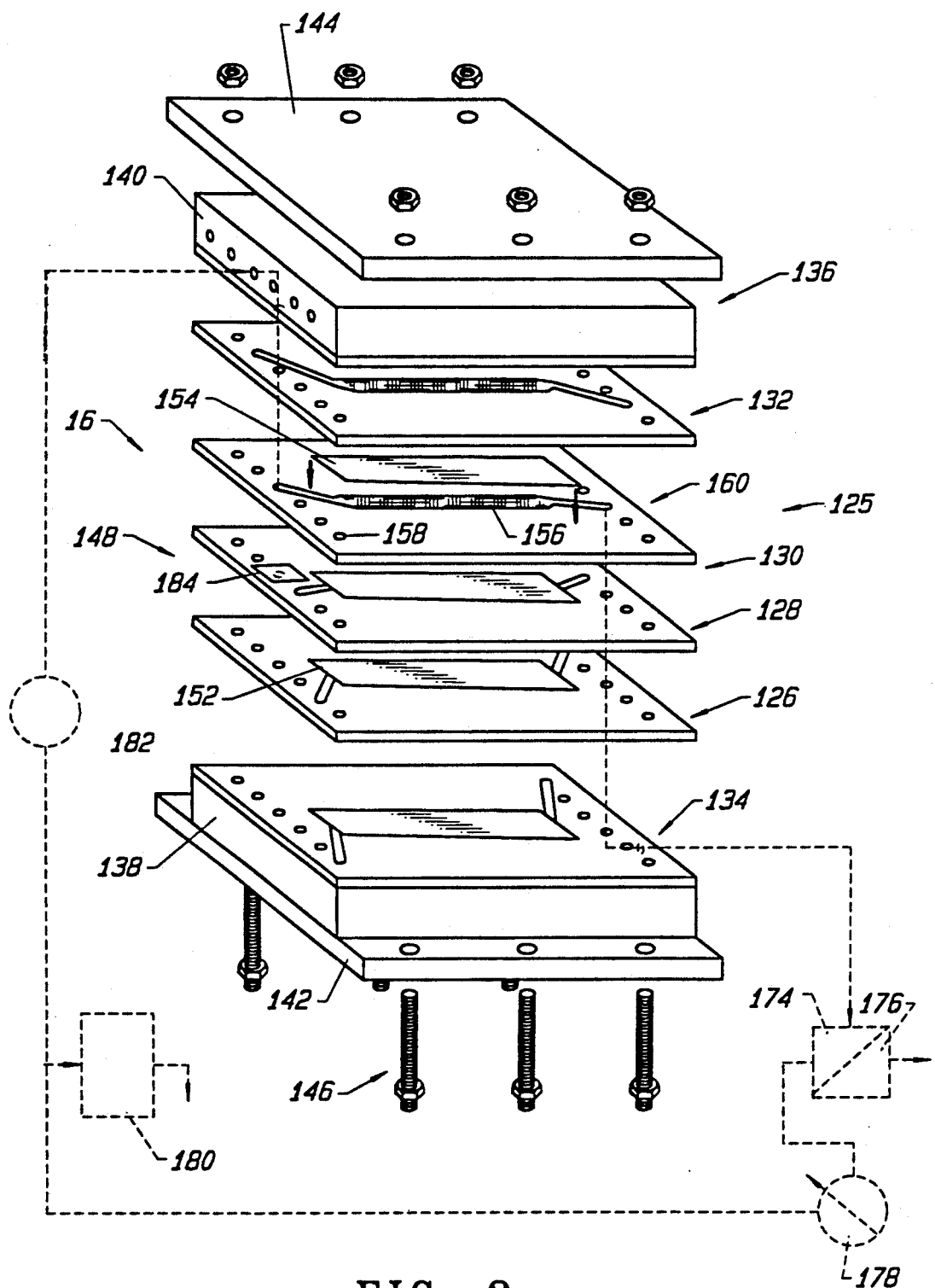
FIG. 2 is a top, left, perspective view of the stacking arrangement forming the container of the present invention with processing components for a particular chamber depicted in phantom.
Figure 4:
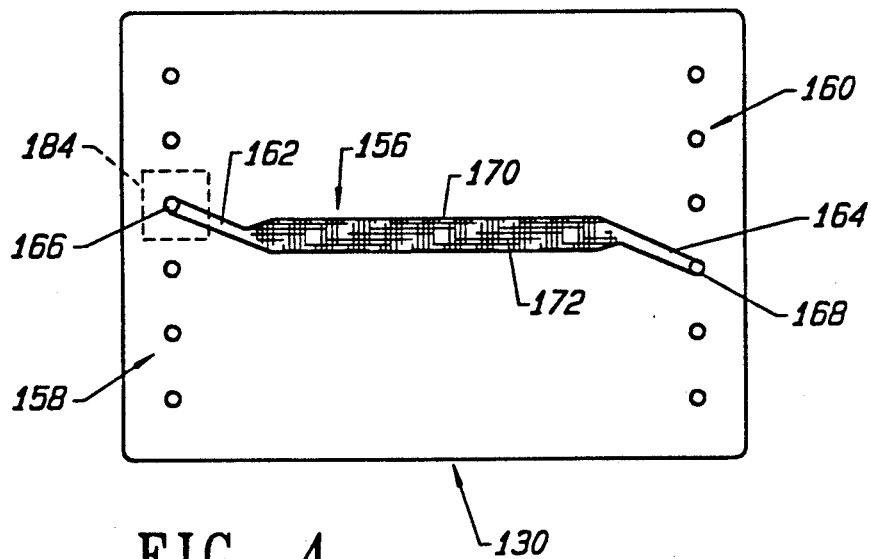
FIG. 4 is a top plan view of a portion of one of the trays of the present invention having blending means shown thereupon.

Electrode assemblies 138 and 140, similar to electrode assemblies 60 and 62 of FIGS. 1 and 3, are enclosed in structures 138 and 140. Pressure plates 142 and 144 sandwich or stack trays 126, 128, 130, 132, and electrode assemblies 136 and 138. Plurality of nuts and bolts 146 maintain the integrity of the stack unit 148. Each tray, 126, 128, 130, and 132 includes a microporous separation membrane such as membranes 150, 152, 154, and one not shown in FIG. 2, respectively. Separation membranes 150, 152, and 154 are similar to plurality of, separation membranes 16 illustrated schematically on FIG. 1. With reference to tray 130, it may be observed that a channel 156 extends across tray 130 from set of openings 158 through tray 132 to set of openings 160 through tray 130. With reference to FIG. 4, channel 156 is shown to include neck portions 162 and 164 which align with openings 166 and 168, respectively. A widened portion 170 of channel of 156 which serves as positioning place for means 172 for blending the particles mixed with the liquid flowing though channel 156. Blending means 172 may take the form of a polypropylene screen sold as Vexar by Conwed Plastics of Minneapolis Minn. Channel 156 through tray 130 essentially forms a chamber between separation membranes 152 and 154. Channel 156 is purposefully narrow (aspect ratio of preferably 5.1) to prevent pressure perturbations near the surfaces of separation membranes 16. Cross-flow velocity through separation chambers 16 is maintained as low as possible, in this regard. Stack 148 includes a number of separation chambers similar to the separation chamber formed by channel 156. Such separation chambers are represented schematically on FIG. 1 by a plurality of separation chambers 14. FIG. 2 also depicts a schematic representation of a typical cross-flow stream through channel 156 where support structures 138 and 140 serve as a manifold, in addition to housing electrode assemblies 136 and 138. The stream enters structure 140 and passes downwardly through an opening in tray 132 to the neck 162 of channel 156. Since tray 128 prevents passage of stream further downwardly, the stream travels along neck 162 and into widened portion 170 of channel 156. At this point, the stream can pass through membranes 152 or 154 into the channels or chambers formed by trays 128 or 132, or continue through widened portion 172 to neck 164 in cross-flow pattern. The stream then passes through one of the openings of plurality of openings 160 and through similar openings in trays 128 and 126 to support structure 138. At this point the stream is manifolded to ultrafiltration module 174 having waste chamber 176 and then to heat exchanger 178. A particular particle may be harvested or tapped by product recovery tap 180 or passed back into channel 156 via structure 140 through circulation pump 182.

A block 184 beneath opening 166 on try 128 serves to prevent diversion of the stream through channel 156. Block similar to block 184 may be employed throughout stack 148 to direct multiple streams as desired, according to the schematic representation of FIG. 1.

In operation, a slurry, colloidal suspension, or other mixture of liquid and heterogeneous particles is injected into feed injector 28. Simultaneously, a buffer solution is fed by pumping means 24 from buffer source 26 into container 12. Circulation pump 30 also feeds the heterogeneous particle-liquid mixture from injector 28 into container 12 at separation chamber 18. Means 58 is activated such that an electric field is impressed on container 12. As a result, the portion of the effluent entering separation chamber 18 crosses separation chamber 18 and is recirculated by circulation pump 30. On the other hand, a portion of the particles placed in container 12 by feed injector 28 passes through separation membrane 22 and into separation chamber 20. The cross-flow through chamber 20 is sent to ultrafiltration module 36 where buffer is removed to waste tank 56. Flow resistor 52 or a permeate pump 54 controls the rate of removal of buffer to tank 56 and, thus, determines a mean flow rate through container 12. The particulate matter sought for separation mixed with a liquid, such as water, leaves ultrafiltration module 36, passes through circulation pump 44, and heat exchanger 46 for reentry into separation chamber 20. As depicted in FIG. 1, a multiplicity or plurality of separation chambers 14 are stacked or placed in series, each being formed by a multiplicity of separation membranes 16. The polarization effects of electrode assemblies 60 and 62 are cancelled by the exemplar diafiltration membrane 74 and ultrafiltration membrane 86 to form electrode chamber 72 and isolation chamber 84. Electrolyte pump 76 and ballast 90 maintain a constant pH in chambers 72 and 84. Gas stream 80 represents purging means for gaseous products formed by electrode 64 while makeup stream 82 replenishes the necessary components of the electrolyte in tank 78 to maintain the constant pH desired. The same structure and process exists in electrode assembly 60. With reference to FIG. 1 it may be seen that electrode assembly 62 has been designated as a cathodic source while electrode assembly 60 represents an anode source. Thus, the mean flow across the plurality of separation membranes 14 impressed by pumping means 24 and the ultrafiltration modules such as 36, arrow 32, is counteracted by the electric field impressed by means 58, arrow 59, FIG. 1. It should be noted that ultrafilters such as ultrafilter 104 may be associated with each separation chamber of plurality of separation chambers 14. By placing a large number of plurality of separation membranes 16 in series a high degree of separation can be achieved across container 12, re presented by stack unit 148, FIG. 2. In other words, the plurality of trays 125 or associated plurality of separation membranes 16 fractionate the particulate matter to be separated, introduced into separator 10 by feed injector 28. It should also be noted that accumulation of different fractions may be readily adjusted by the operation of the flow resistors 52 and 114 or permeat pumps 54 and 116, FIG. 1. A choice can be made to select a number of recovery trays or membranes to obtain the desired number of fractions or the desired purity of the fractions of the particulate matter to be separated.

Specifically, electrolytic buffer is driven into chamber 18 at a flow rate Q ml/minute. Electrolytic buffer is removed from, for example, typical ultrafilter module 36 at a rate q ml/minute by the adjustment of flow resistor 52 or permeate pump 54. The quantity $(Q-q)$ ml/minute represents the mean flow through membrane 23 and into chamber 25. Since there is a distinct rate of buffer removed from each ultrafilter module in the system 10, a particular q ml/minute is removed throughout the system, thus adjusting the mean flow through the multiplicity of separation chambers 14. Combining the careful setting of the values Q, q and the total current I between the electrodes in the electro assemblies 60 and 62, the particles to be separated within separator 10 will be subject to the convective forces represented by arrow 32 and the opposite electric field forces represented by arrow 59. For example, in the case of proteins injected for separation, highly electrophoretically mobile proteins will be pulled toward the electrode assembly 60 near bottom chambers 18 and 20 of container 12. On the other hand less electrophoretically mobile proteins will gather near chambers 92 and 94 of container 12. The ultrafiltration module such as modules 36 and 104 will prevent the proteins from leaving stack unit 148 within container 12. In essence, the separator 10 circulates the injected particle-fluid mixture past the multiplicity of separation of membranes 16 in a laminar flow manner at a constant pressure gradiant. Heat exchangers such as heat exchangers 46 and 108 are especially useful when biological entities, such as proteins, are to be separated within separator 10 as temperature fluctuations tend to destroy biological particles. Although there may be a temperature gradiant across any of the multiplicity of separation chambers 16, a conductivity gradient generally cancels viscosity gradient if a constant current I (not voltage) is used, in this regard. In other words:

Conductivity × Viscosity = a constant

Thus, the migration velocity of any charged particle becomes independent of temperature when a constant current is applied to system 10.

Figure 5:
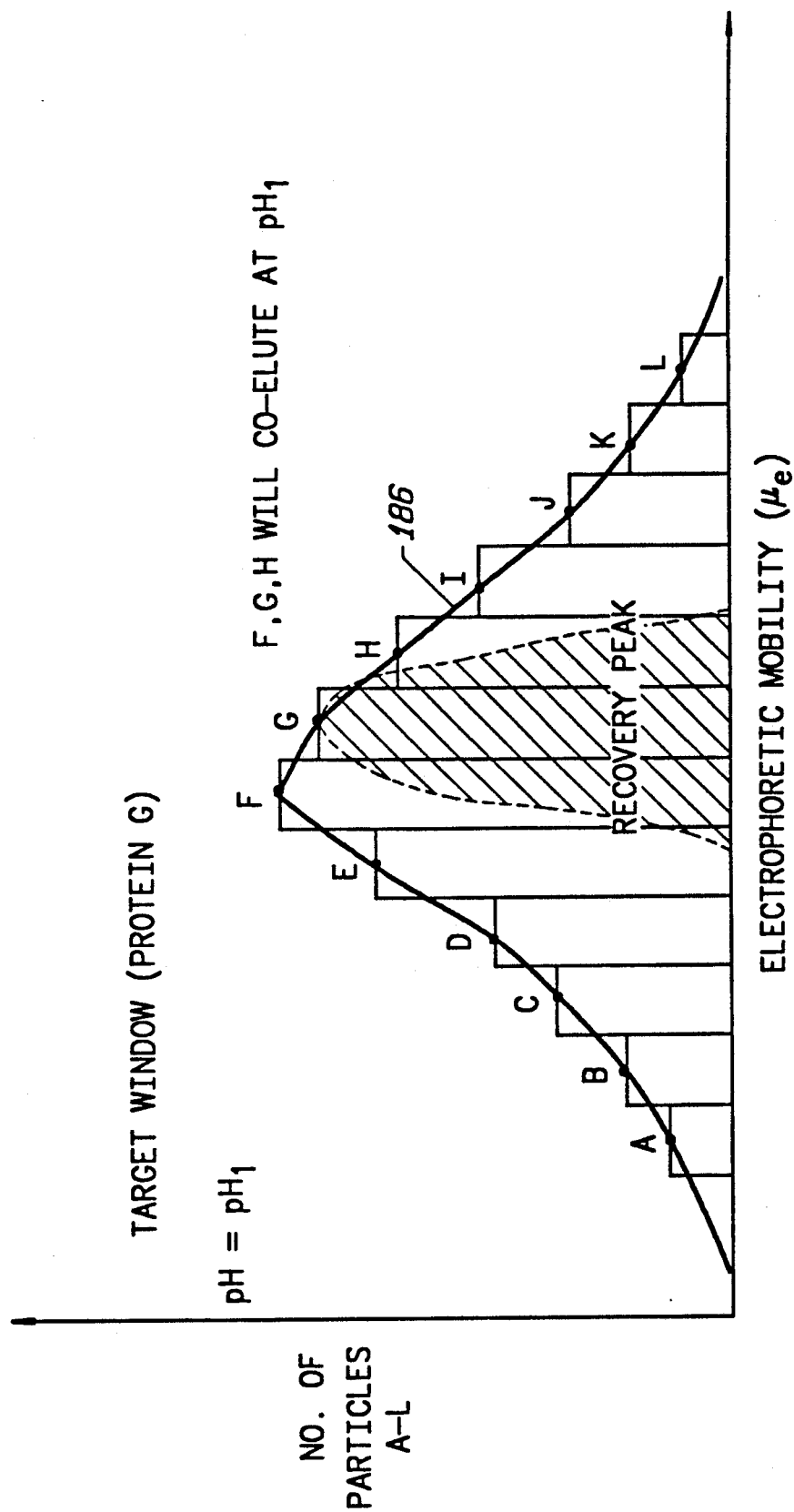
FIG. 5 is a graph depicting a typical illustration of a twelve chamber or tray arrangement of the present invention.
Figure 6:
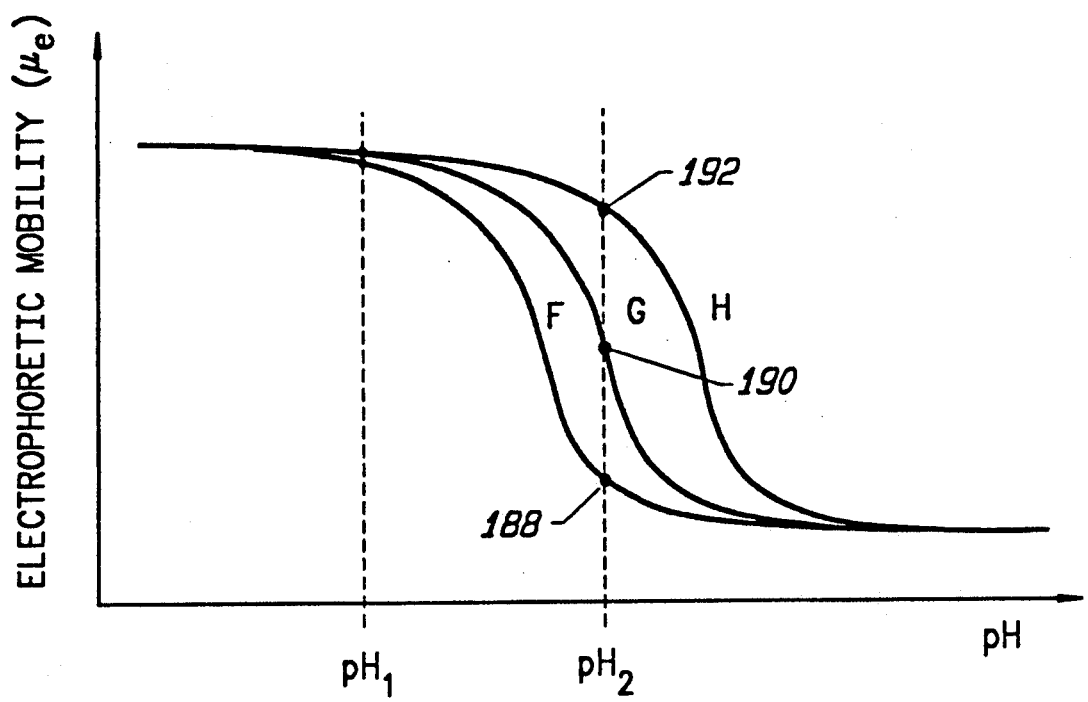
FIG. 6 is a graph depicting the separation obtained from multiple separators of the present invention operated at different pH values.
Figure 7:
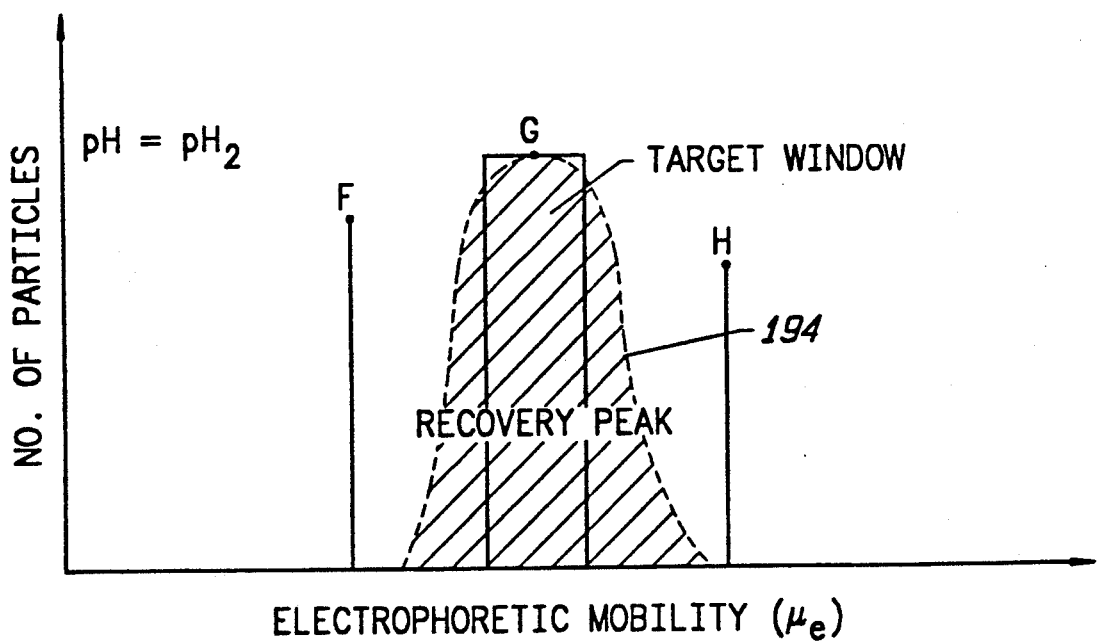
FIG. 7 is a graph depicting the resultant separation of a particular protein utilizing two separators of the present invention operating at different pH values.

With reference to FIG. 5, it may be observed that a separator 10 has been employed utilizing 12 separation chambers labeled A-L to separate proteins. A typical bell-shaped, mobility-distribution, curve 186 is obtained in conjunction with the removal of distinct proteins A-L, with the peak recovery being at a central membrane having a protein "F". It should be noted that the peak of such bell-shaped curve 186 may be shifted by adjusting the values for Q, or q for each of the separation chambers 14. The results depicted in FIG. 5 show a system within separator 10 which has been kept at a certain $pH_1$ by the use of electrolytic buffers coming from source 26. At $Ph_1$ certain proteins, "F, G, and H," will co-elute at the separation chamber where one would normally expect to find protein G, the target window for protein G. Thus it might be said that proteins "F, G, and H" possess nearly the same electrophoretic mobility and resistance to convective flow at a particular pH. One may then remove these proteins and inject them into a second separator 10 having similar convective and opposing electric field parameters, but at a different pH. With reference to FIG. 6 the result of a pH shift is depicted to show that electrophoretic mobilities of these co-eluted proteins change. Points 188, 190, and 192 represent the particular electrophoretic mobility of proteins of F, G, and H, respectively, at $pH_2$. Thus, with refence to FIG. 7, an improved recovery peak, represented by curve 194, may be obtained by operating second separator 10 at $pH_2$. It should be understood that more complex mixtures of particles containing, for example, hundreds of proteins may be completely separated using this procedure.

While in the foregoing embodiments of the present invention have been set forth in considered detail for the purposes of making a complete disclosure of the invention, it may be apparent to those of skill in the art that numerous changes may be made in such details without departing from the spirit and principles of the invention.

What is claimed is:

1. A separator for heterogeneous particles mixed with a liquid comprising:

a. a container for holding the heterogeneous particles mixed with the liquid;
  b. a separation membrane permeable to at least a portion of said heterogeneous particles mixed within liquid, said separation membrane dividing said container into first and second separation chambers each having an inlet and an outlet;
  c. means for pumping at least a portion of the heterogeneous particles mixed with the liquid in said container to bias flow of said heterogeneous particles mixed with the liquid in said container to bias flow of said heterogeneous particles mixed with the liquid through said separation membrane from said first separation chamber to said second separation chamber;
  d. means for applying an electrical potential to the heterogeneous particles mixed with the liquid to bias flow of at least a portion of the heterogeneous particles through said membrane from said second separation chamber to said first separation chamber;
  e. means for injecting an electrolytic buffer into said container, said electrolytic buffer mingling with the heterogeneous particles mixed with the liquid within the container;
  f. filter means for segregating said electrolytic buffer from said heterogeneous particles exiting said first separation chamber of said container; said filter means communicating with the outlet of said first separation chamber; and
  g. means for recirculating said first separation chamber heterogeneous particles segregated by said filter means into said first separation chamber at a predetermined rate.

2. The separator of claim 1 which additionally comprises a heat exchanger for removing heat from said segregated first and second separation chamber particles.

3. The separation of claim 1 which additionally comprises filter means for segregating said electrolytic buffer from said particles exiting said second separation chamber of said container.

4. The separator of claim 3 which additionally comprises means for recirculating said segregated first and second separation chamber particles into said first and second separation chambers, respectively.

5. The separator of claim 1 which further includes means for blending said particle and liquid mixture within said first and second separation chambers.

6. The separator of claim 1 in which said means for applying an electric potential to the heterogeneous particles mixed with the liquid in said container includes one electrode within said container and a protective membrane substantially preventing the passage of ions, said protective membrane being permeable to said electrical potential and forming an electrode chamber enclosing said one electrode.

7. The separator of claim 6 in which said means for applying an electrical potential to the heterogeneous particles mixed with the liquid in said container includes another electrode within said container and a protective membrane substantially preventing the passage of ions, said protective membrane being permeable to said electrical potential and forming an electrode chamber enclosing said another electrode, said separation membrane lying between said one and another electrodes in said container.

8. The separator of claim 7 in which additionally comprises an isolation membrane impermeable to said heterogeneous particles and permeable to the liquid, said isolation membrane forming an isolation chamber lying between said electrode chamber and said first and second separation chambers in said container.

9. The separator of claim 8 which further comprises means for injecting an electrolytic buffer into said isolation chamber.

10. The separator of claim 9 which additionally comprises means for recirculating electrolytic buffer from and into said isolate chamber.

11. The separator of claim 8 which additionally comprises means for circulating electrolyte through said electrode chamber.

12. The separator of claim 8 which further comprises means for purging gases from said electrolyte circulated through said electrode chamber.

13. The separator of claim 1 in which said separation membrane is a first separation membrane and which further includes a second separation membrane forming a third separation chamber lying adjacent said second separation chamber, said pumping means biasing the flow of at least a portion of the heterogeneous particles mixed with the liquid through said second separation membrane from said second separation chamber to said third separation chamber, and said means for applying an electric potential to the heterogeneous particles mixed with the liquid mixed with the liquid biasing flow of at least a portion of the heterogeneous particles through said membrane from said third separation chamber to said second separation chamber.

14. The separator of claim 1 in which said separation membrane is a first separation membrane and which further comprises a multiplicity of additional membranes forming a plurality of adjacent separation chambers adjacent said first and second separation chambers, said pumping means biasing the flow of at least a portion of the heterogeneous particles mixed with the liquid through said first separation membrane and said multiplicity of separation membranes, and from said second chamber to said plurality of adjacent separation chambers, and said means for applying an electrical potential to the heterogeneous particles mixed with the liquid biasing flow of at least a portion of the heterogeneous particles through said multiplicity of separation membranes and said first separation membrane, and from said plurality of adjacent separation chambers to said first and second separation chambers.

15. A method of separating heterogeneous particles in a liquid
comprising the steps of:
  a. confining the heterogeneous particles to one container;
  b. dividing the containers into first and second separation chambers with a separation membrane permeable to at least a portion of the heterogeneous particles said first and second separation each having an inlet and an outlet;
  c. pumping at least a portion of the heterogeneous particles mixed with the liquid in said one container to bias flow of said heterogeneous particles mixed with the liquid through said separation membrane, from said first separation chamber to said second separation chamber;
  d. applying an electrical potential to the heterogeneous particles mixed with the liquid to bias flow of at least a portion of the heterogeneous particles through said separation membrane, from said second separation chamber to said first separation chamber;
  e. segregating said electrolytic buffer from said heterogeneous particles exiting said first separation by employment of filter means communicating with the outlet of said first separation chamber, and
  f. recirculating said first separation chamber heterogeneous particles segregated by said filter means into said first separation chamber and at a predetermined rate.

16. The method of claim 15 in which said separation membrane is one membrane and further includes a multiplicity of separation membranes forming a plurality of adjacent separation chambers, said step of pumping biases the flow of said heterogeneous particles mixed with the liquid through said multiplicity of separation membranes in one direction and said step of applying an electrical potential bias the flow of said heterogeneous particles through said multiplicity of separation membranes in the other direction.

17. The method of claim 12 which further comprises the step of maintaining a substantially homogeneous pH within said one container.

18. The method of claim 17 which further comprises the steps of
  a. removing particles with the liquid from at least one of said plurality of adjacent chambers in said one container after said steps of pumping and applying an electric field;
  b. inserting said removed particles with the liquid in another container;
  c. dividing said another container into first and second separation chambers with a separation membrane permeable to at least a portion of the particles removed from said chamber of said one container;
  d. pumping at least a portion of the particles mixed with the liquid in said another container to bias flow of said particles mixed with the liquid through said separation membrane in said another container from said first separation chamber to said second separation chamber;
  e. applying an electrical potential to the particles mixed with the liquid inserted in the another container to bias flow of at least a portion of the particles in the another container through said separation membrane from said second separation chamber to said first separation chamber of said another container; and
  f. maintaining a pH in said another container different from said pH in said one container.

19. The method of claim 18 which further comprises the steps of injecting electrolytic buffer into said one container for mingling with the heterogeneous particles mixed with the liquid and segregating said electrolytic buffer from said particles in said first separation chamber of said container.

* * * * *